UNITED STATES PATENT OFFICE.

WILLIAM O. KAISER AND GEORGE F. STROEBEL, OF BURLINGTON, IOWA.

UNFERMENTED BEVERAGE.

1,164,193. Specification of Letters Patent. Patented Dec. 14, 1915.

No Drawing. Application filed September 27, 1915. Serial No. 52,929.

*To all whom it may concern:*

Be it known that we, WILLIAM O. KAISER and GEORGE F. STROEBEL, citizens of the United States, residing at Burlington, in the county of Des Moines and State of Iowa, have invented certain new and useful Improvements in Unfermented Beverages; and we hereby declare that the following is a full, clear, and exact description thereof.

This invention is an improved beverage closely resembling beer in appearance and flavor but non-alcoholic.

The object of the invention is to produce a beverage having practically all the characteristic of beer but without alcohol, and practically free from tannin.

The novel beverage is produced from malt, hops, cereals and yeast, and yeast extracts, unfermented, with natural acids and flavors.

In carrying out the invention the beverage may be made as follows:—Ground malt is mashed or infused with water (in the proportion of 100 lbs. malt to one barrel of water, 31 gal.) at 30° Réaumur and the resultant wort peptonized one hour. By "peptonized" we refer to the known fact that malt contains an enzym called peptase which at certain known temperatures will act upon albuminoids, changing them into soluble albumins, peptones and amids. Holding the wort at 30° R. insures the peptonizing thereof. In another vessel containing water is placed 75 lbs. ground cereals such as rice, grits, etc., together with 2% of the malt mash liquid or "lautermash" to each barrel of water, the mixture is then peptonized for 25 minutes at 30° R. then raised to the boiling point and boiled for 50 minutes. The remainder of the lautermash or malt mash liquid is now drained off from the ground malt into a special vessel fitted with steam pipes for boiling. This lautermash, contains starch, dextrin, maltose, soluble albumins, peptones and amids. To the lautermash may now be added a small portion of a catalytic agent such as a diluted mineral acid, such as sulfuric, phosphoric or hydrochloric, or a solution of maltase; we preferably use 20 minims of 92.5% sulfuric acid per barrel of lautermash, such mineral acid being preferable to maltase, owing to likely contamination with yeast cells; the mixture is then boiled from one to one and a half hours to convert the starch, dextrin and maltose into glucose, and to cause the precipitation or breaking up of the amids which otherwise give an undesirable flavor. The sulfuric acid may now be neutralized by adding a sufficient amount of sodium acetate and lactate to free the acetic and lactic acids in the treated lautermash; but we deem it preferable to exactly neutralize the sulfuric acid with sodium carbonate. The treated and neutralized lautermash is then run into a kettle. The cereal mash liquid mixed with 2% of the lautermash, is then transferred to the malt mash tub containing the residue of the ground malt, and the temperature raised to 59° R. in five minutes, at which temperature the diastase yet remaining in the malt saccharifies all the starch. Raising the temperature to 59° R. in five minutes converts the starch of the cereal wort into maltose and dextrin. The resultant cereal wort is now transferred to the kettle containing the treated lautermash and two pounds washed yeast per barrel added thereto and the whole raised to the boiling point and boiled for four hours. One sixth pound hops per barrel is then added to the mixture and the boiling continued for fifty minutes after which one sixth pound more hops per barrel is added to the mixture and the boiling continued for ten minutes. The product is now cooled to 8° R. and run into a tank which contains a mixture of acetic, lactic and succinic acids and ethyl acetate in about the proportions in which they exist in beer, and the whole digested at this temperature (8° R.) for twenty-four hours. We preferably use for such acid mixture 3.83 gm. acetic acid, 21. gm. latic acid .047 gm. succinic acid and 3 minims ethel acetate per barrel. The product is then cooled to freezing point, carbonated and filtered. By digesting the product mixed with the acids we ripen, blend, mellow and enrich the flavor of the product and delay deterioration thereof.

The object of the special treatment of the peptonized wort (lautermash or malt mash liquid) is to induce changes very similar to those of fermentation by chemical means, but without the production of alcohol. Our process leaves in the peptonized wort a residue of glucose or grape sugar, which in the usual fermentation process would be changed into alcohol and carbonic acid gas. This residual glucose or grape sugar is beneficial to our beverage, giving it a higher food value and enhancing its flavor.

We are aware that starch, dextrin and maltose may be converted into glucose by the catalytic action of mineral acids in dilute solution and boiling. This is an old commercial process. We are also aware that malto-dextrin and maltose may be converted into glucose by the catalytic action of the enzym "maltase" (glucase) which may be extracted from dry yeast by water. We are aware also that certain acids and ethers exist in beer due to the chemical action produced by the growing yeast, (fermentation). But the production of an unfermented beverage made from malt, hops, cereals and yeast or yeast extract and the addition thereto of acids and ethers by direct addition or by chemical change (acetic, lactic, succinic acids and ethyl acetate) thus giving the beverage the flavor or taste of the fermented beverage made from the same materials is we believe entirely novel.

The essentially novel features of our process are treating the lautermash or malt mash liquid as explained, by catalysis, using any mineral acid, maltase or other catalytic agent to convert the starch, dextrin, and maltose into glucose, and using the so treated lautermash in the manufacture of any beverage made from malt, hops, cereals and yeast extract. Also the addition of, or the production of, by chemical means (other than by fermentation) the acids common to beer to an unfermented beverage produced from malt, hops, cereals and yeast extract. Also in our process the yeast is extracted and the entire soluble food values are dissolved in the product.

What we claim is:

1. In the process of producing beverages treating lautermash of a malt mash liquid with a catalytic agent, to convert the starch, dextrin, and maltose into glucose.

2. In the process of producing beverages treating lautermash of a malt mash liquid with a catalytic agent, to convert the starch, dextrin, and maltose into glucose; and mixing the so treated lautermash with a liquid extract of malt, hops, cereals and yeast.

3. In the process of producing an unfermented beverage from malt, hops, cereals and yeast extracted; producing therein by chemical means (other than by fermentation) the acids common to beer.

4. The herein described process of making a non-alcoholic beverage consisting in first making a lautermash and peptonizing same; second, mixing ground cereals in water with about 2% of the peptonized lautermash to each barrel of water, and peptonizing same and then boiling same for about 50 minutes; third, adding to the remainder of the lautermash liquid diluted mineral acid, and boiling same and then neutralizing the acid; fourth, adding the cereal mash liquid mixed with about 2% of the lautermash to the residue of the ground malt and raising the temperature thereof to about 59° R. in about five minutes; fifth, mixing the resultant cereal wort with the treated lautermash and about two pounds washed yeast per barrel, and boiling the mixture; then adding about one sixth pound hops per barrel to the mixture and boiling for about fifty minutes; then adding about one sixth pound more hops per barrel to the mixture and boiling for about ten minutes; sixth, cooling the product and adding thereto a mixture of beer acids in about the proportions in which they exist in beer, and digesting the whole for about twenty-four hours; and finally cooling, carbonating and filtering the product.

5. The herein described process of making a non-alcoholic beverage consisting in (1) making a lautermash by infusing ground malt with water and peptonizing same; (2) mixing ground cereals in water together with 2% of the "lautermash" to each barrel of water, and peptonizing same for about 25 minutes at 30° R. then boiling same for about 50 minutes; (3) adding to the remainder of the lautermash a small portion of a catalytic agent, and boiling same to convert the starch, dextrin and maltose into glucose, and cause the precipitation or breaking up of the amids, then neutralizing the acid; (4) adding the cereal mash liquid mixed with about 2% of the lautermash to the residue of the ground malt; and quickly raising the temperature thereof to saccharify all the starch and convert the starch of the cereal wort into maltose and dextrin; (5) mixing the resultant cereal wort with the treated lautermash and about two pounds washed yeast per barrel and boiling the mixture for four hours; then adding about one sixth pound hops per barrel to the mixture and continuing the boiling for about fifty minutes; then adding about one sixth pound more hops per barrel to the mixture and continuing the boiling for about ten minutes; (6) cooling the product and adding thereto a mixture of acetic, lactic and succinic acids and ethyl acetate in about the proportions in which they exist in beer, and digesting the whole for twenty-four hours; (7) finally cooling, carbonating and filtering the product.

6. The herein described process of making a non-alcoholic beverage consisting in (1) making a lautermash by infusing ground malt with water and peptonizing same one hour; (2) mixing ground cereals together with about 2% of the malt mash liquid or "lautermash" to each barrel of water, and peptonizing same for about 25 minutes at 30° R. then boiling same for about 50 minutes; (3) adding to the remainder of the lautermash or malt mash liquid a small portion of a diluted mineral acid, and boiling same to convert the starch, dextrin and maltose into glucose, and to cause the precipitation or breaking up of the amids, then neutralizing the acid; (4) adding the cereal mash liquid mixed with about 2% of the lautermash to the residue of the ground malt; and raising the temperature thereof to about 59° R. in five minutes, to saccharify all the starch and convert the starch of the cereal wort into maltose and dextrin; (5) mixing the resultant cereal wort with the treated lautermash and about two pounds washed yeast per barrel and boiling the mixture for about four hours; then adding about one sixth pound hops per barrel to the mixture and continuing the boiling for fifty minutes; then adding about one sixth pound more hops per barrel to the mixture and continuing the boiling for about ten minutes; (6) cooling the product to about 8° R. and adding thereto a mixture of acetic, lactic and succinic acids and ethyl acetate in about the proportions in which they exist in beer, and digesting the whole at a temperature of about 8° R. for twenty-four hours; and (7) finally cooling, carbonating and filtering the product.

7. A base for a non-alcoholic beverage derived by treating lautermash of a malt mash liquid with a catalytic agent, substantially as described.

8. A base for a non-alcoholic beverage derived by treating lautermash of a malt mash liquid with a catalytic agent, and mixing the so treated lautermash with a liquid extract of malt, hops, cereals and yeast.

9. A non-alcoholic unfermented beverage produced from malt, hops, cereals and yeast and containing acids common to beer produced by chemical means, substantially as described.

In testimony that we claim the foregoing as our own, we affix our signatures in presence of two witnesses.

WILLIAM O. KAISER.
GEORGE F. STROEBEL.

Witnesses:
C. F. BUHRMASTER,
A. J. WIRTH.